United States Patent
Tanriverdi

(10) Patent No.: US 9,002,617 B2
(45) Date of Patent: Apr. 7, 2015

(54) GAS TURBINE ENGINE CONTROLLER WITH EVENT TRIGGER

(71) Applicant: General Electric Company, Schenectady, NY (US)

(72) Inventor: Olgu Tanriverdi, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 55 days.

(21) Appl. No.: 13/938,838

(22) Filed: Jul. 10, 2013

(65) Prior Publication Data

US 2015/0019104 A1 Jan. 15, 2015

(51) Int. Cl.
G06F 19/00 (2011.01)
F02C 9/00 (2006.01)
G05B 17/02 (2006.01)

(52) U.S. Cl.
CPC .. F02C 9/00 (2013.01); G05B 17/02 (2013.01)

(58) Field of Classification Search
CPC ....................................................... F02C 6/08
USPC .................. 701/100, 110, 111, 114
See application file for complete search history.

(56) References Cited

U.S. PATENT DOCUMENTS

| | | | |
|---|---|---|---|
| 3,875,384 A | 4/1975 | Davis | |
| 3,928,972 A * | 12/1975 | Osborne | 60/646 |
| 4,161,101 A * | 7/1979 | Drummond | 60/773 |
| 4,455,820 A * | 6/1984 | Buckley et al. | 60/773 |
| 6,249,563 B1 | 6/2001 | Snyder et al. | |
| 6,844,818 B2 | 1/2005 | Grech-Cini | |
| 6,866,040 B1 | 3/2005 | Bourdon | |
| 7,012,409 B2 | 3/2006 | Schreiber et al. | |
| 7,826,954 B2 * | 11/2010 | Muramatsu et al. | 701/100 |
| 7,875,834 B2 | 1/2011 | Bujeau et al. | |
| 7,905,231 B2 | 3/2011 | Chalvignac | |
| 7,997,083 B2 | 8/2011 | Meadows et al. | |
| 8,251,062 B2 | 8/2012 | Chalvignac | |
| 8,355,854 B2 | 1/2013 | Childers | |
| 2009/0178417 A1* | 7/2009 | Draper et al. | 60/783 |
| 2010/0286889 A1* | 11/2010 | Childers | 701/100 |
| 2011/0154821 A1* | 6/2011 | Evans-Beauchamp | 60/615 |

* cited by examiner

Primary Examiner — Khoi Tran
Assistant Examiner — Jorge Peche
(74) Attorney, Agent, or Firm — Cantor Colburn LLP

(57) ABSTRACT

A feedback control system is provided and includes a controller to control an operation of a motive element in accordance with current and previous measured states. The controller includes a servo, a processor and an event trigger controller. The event trigger controller is configured to cause the processor to command the servo to perform model based control (MBC) executions in an event a difference between the current and previous measured states exceeds a threshold based on the previous measured state or the current measured state exceeds a limit, and skip the MBC executions in an event the difference does not exceed the threshold and the current measured state does not exceed the limit.

20 Claims, 2 Drawing Sheets

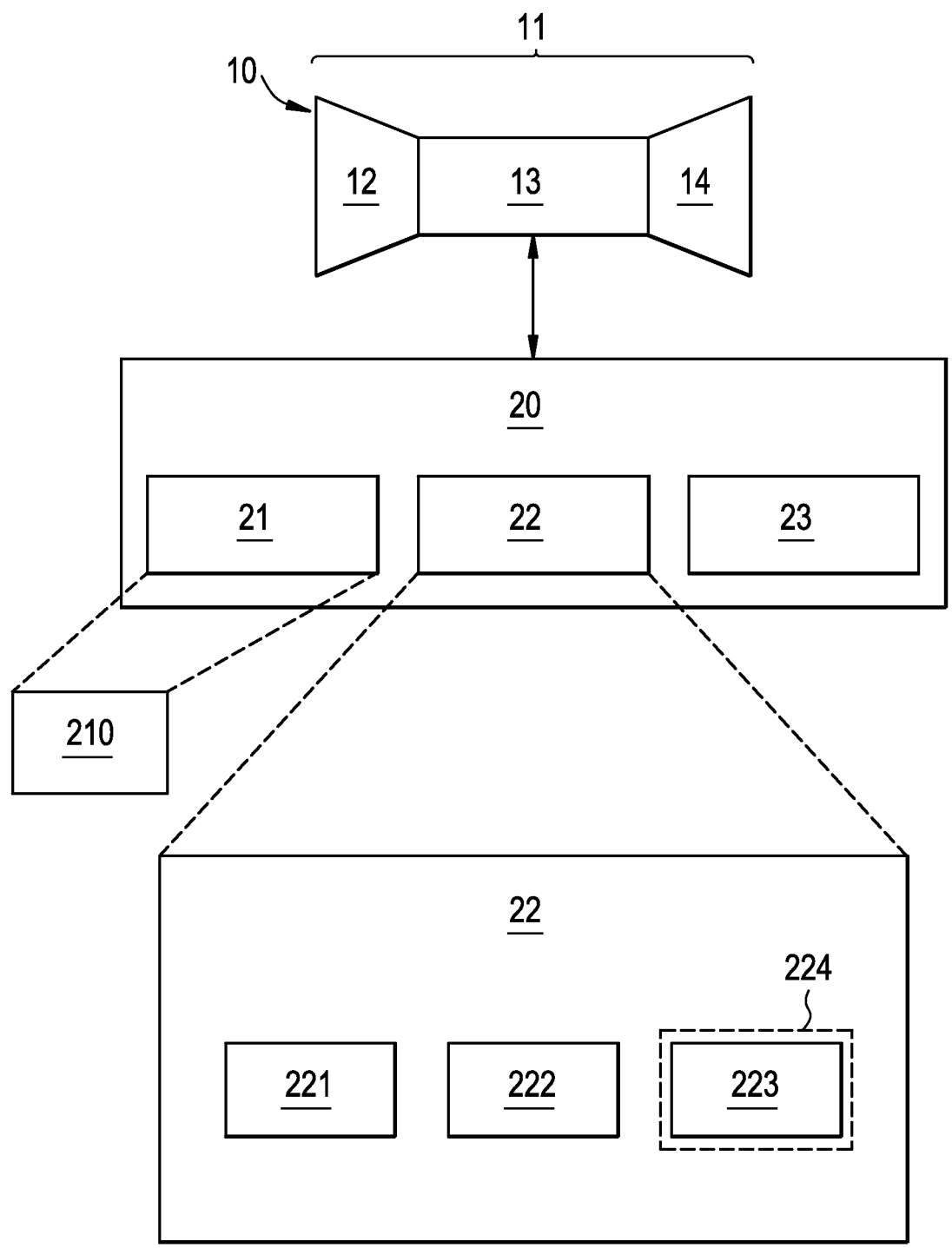

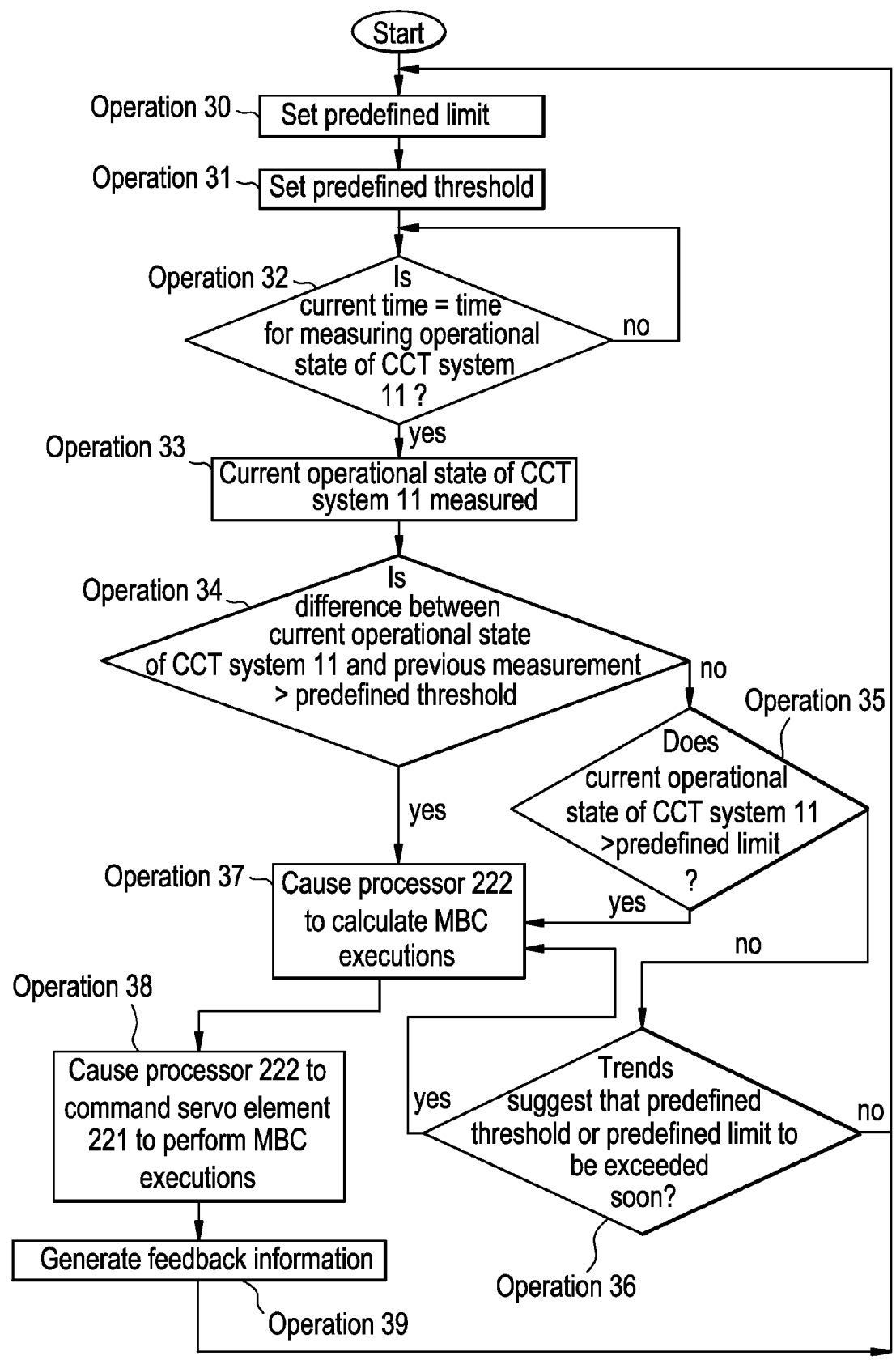

GAS TURBINE ENGINE CONTROLLER WITH EVENT TRIGGER

BACKGROUND OF THE INVENTION

The subject matter disclosed herein relates to a gas turbine engine controller and, more particularly, to a gas turbine engine controller with an event trigger providing for reduced number of control executions.

A gas turbine engine may include a compressor, a combustor and a turbine section. The compressor compresses inlet air and outputs the compressed inlet air to the combustor. The combustor mixes the compressed inlet air with fuel and ignites the mixture to produce high temperature and high pressure fluids. The high temperature and high pressure fluids are directed to the turbine section where they are expanded to generate the mechanical energy. The gas turbine engine may further include multiple control and feedback control systems to monitor, control and if necessary correct operations of the gas turbine engine.

The control and feedback control systems often employ model based control (MBC) functionality in performing the monitoring, controlling and correcting of the gas turbine operations. Typically, this involves periodically measuring states of the gas turbine engine, applying appropriate controllers and then generating and employing feedback information via actuators. However, since the gas turbine engine could be running at a stable operation point, it may require little or no attention. In such cases, the MBC functionality may be unnecessary.

BRIEF DESCRIPTION OF THE INVENTION

According to one aspect of the invention, a feedback control system is provided and includes a controller to control an operation of a motive element in accordance with current and previous measured states. The controller includes a servo, a processor and an event trigger controller. The event trigger controller is configured to cause the processor to command the servo to perform model based control (MBC) executions in an event a difference between the current and previous measured states exceeds a threshold based on the previous measured state or the current measured state exceeds a limit, and skip the MBC executions in an event the difference does not exceed the threshold and the current measured state does not exceed the limit.

According to another aspect of the invention, a feedback control system of a gas turbine engine is provided and includes a controller to control an operation of the gas turbine engine in accordance with current and previous measured states. The controller includes a servo, a processor and a computer readable medium on which executable instructions are stored. When executed, the executable instructions cause the processor to command the servo to perform model based control (MBC) executions in an event a difference between the current and previous measured states exceeds a threshold or the current measured state exceeds a limit; and to command the servo to skip the MBC executions in an event the difference does not exceed the threshold and the current measured state does not exceed the limit.

According to yet another aspect of the invention, a gas turbine engine is provided and includes a compressor-combustor-turbine (CCT) system by which mechanical energy is generated from combustion of compressed inlet air and fuel and a feedback control system including a measurement unit configured to measure a state of the CCT system, a controller configured to control an operation of the CCT system in accordance with current and previous measured states and a feedback unit configured to provide feedback control information to the controller. The controller includes a servo, a processor and a computer readable medium on which executable instructions are stored. When executed, the executable instructions cause the processor to command the servo to perform model based control (MBC) executions in an event a difference between the current and previous measured states exceeds a threshold or the current measured state exceeds a limit; and to command the servo to skip the MBC executions in an event the difference does not exceed the threshold and the current measured state does not exceed the limit.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 1 is a schematic diagram of a gas turbine engine; and

FIG. 2 is a schematic flow diagram of an operation of the gas turbine engine.

The detailed description explains embodiments of the invention, together with advantages and features, by way of example with reference to the drawings.

DETAILED DESCRIPTION OF THE INVENTION

As described below, event trigger control is applied in gas turbine engine operation along with or in addition to model based control (MBC) in order to eliminate or at least reduce a number of MBC executions. The present approach differs from prior approaches where MBC functionality is periodically executed for each time step while still sustaining high performance gas turbine operations. In accordance with the present approach, the MBC functionality is not executed for each time step if a state condition of the gas turbine engine does not change (e.g., if the gas turbine engine is operating at steady state). Rather, the MBC is calculated and executed when the state condition changes.

With reference to FIG. 1, a motive element is provided. The motive element may be, for example, a gas turbine engine 10. As shown in FIG. 1, the gas turbine engine 10 includes a compressor-combustor-turbine (CCT) system 11 and a feedback control system 20. The CCT system 11 is configured to generate mechanical energy from combustion of compressed inlet air and fuel and includes a compressor 12, a combustor 13 and a turbine section 14. The compressor 12 compresses inlet air and outputs the compressed inlet air to the combustor 13. The combustor 13 mixes the compressed inlet air with fuel and ignites the mixture to produce high temperature and high pressure fluids. The high temperature and high pressure fluids are directed to the turbine section 14 where they are expanded to generate the mechanical energy.

The feedback control system 20 is operably coupled to the CCT system 11 and is provided to control various operations of the CCT system 11. The feedback control system 20 includes a measurement unit 21, a controller 22 and a feedback control unit 23. The measurement unit 21 is configured to periodically measure an operational state of the CCT system 11. The controller 22 is configured to control an operation of the CCT system 11 in accordance with the measured operational state of the CCT system 11. The feedback control unit 23 is configured to provide feedback control information to the controller 22 so that a performance of the controller 22 can be monitored and improved from iteration to iteration.

The measurement unit 21 may include a clock or timing element 210 that governs when the measurement unit 21 periodically measures the operational state of the CCT system 11. Although illustrated as being a component of the measurement unit 21, it is to be understood in accordance with alternative embodiments that the clock or timing element 210 may be provided in the measurement unit 21, the controller 22, the feedback control unit 23, as another element of the feedback control system 20 or as a stand-alone element.

The controller 22 includes a servo element 221, a processor 222 and a computer readable medium 223. The computer readable medium 223 may be a storage unit or database on which executable instructions are stored. The executable instructions may be embodied as software, hardware or a combination thereof. Thus, the executable instructions and cooperatively define an event trigger controller 224. When executed, the executable instructions cause the processor 222 to command the servo element 221 to perform model based control (MBC) executions or to skip the performance of the MBC executions.

In accordance with embodiments, MBC executions may include but are not limited to fuel control executions (i.e., a modulation of relative amounts of compressed air and fuel to be combusted in the combustor 13), inlet guide vane (IGV) control executions (i.e., control of IGV angles in an inlet of the compressor 12) and fire temperature control executions (i.e., control of firing temperatures within the combustor 13, the turbine section 14 and, where applicable, a transition zone fluidly interposed between the combustor 13 and the turbine 14).

More particularly, the executable instructions cause the processor 222 to calculate MBC executions and to command the servo element 221 to perform the calculated MBC executions in an event the measured current operational state of the CCT system 11 (as determined by the measurement unit 21) is unstable relative to a previous measurement. Conversely, the executable instructions cause the processor 222 to command the servo element 221 to skip the MBC executions in an event the measured current operational state of the CCT system 11 (as determined by the measurement unit 21) is stable relative to the previous measurement. For purposes of clarity and brevity, the term "unstable" shall refer to a change in an operational state of the CCT system 11 from a previous measurement to a current measurement whereas the term "stable" shall refer to a case where the operational state of the CCT system 11 is unchanged from the previous measurement to the current measurement. Thus, the current operational state of the CCT system 11 is considered unstable if the current operational state is determined by the measurement unit 21 to have changed from the previously measured state.

It is to be understood that a change in the operational state of the CCT system 11 from the previous measurement to the current measurement that would indicate instability may be small or large in accordance with predefined rules and algorithms. That is, a degree of change from the previous measurement to the current measurement that would be indicative of instability may be defined as any change beyond a predefined threshold or a predefined range of thresholds. Conversely, a degree of change that would be indicative of stability may be defined as any change that does not exceed the predefined threshold or the predefined range of thresholds. In any case, it is to be further understood that the predefined threshold and the predefined range of thresholds are manually or automatically variable in accordance with various considerations including, but not limited to, costs, current and/or historical trends and current operational conditions.

In accordance with embodiments, the executable instructions may cause the processor 222 to calculate MBC executions and to command the servo element 221 to perform the calculated MBC executions perform model based control (MBC) executions in an event a difference between the measured current operational state and the previous measurement exceeds a predefined threshold that is based on the previous measurement or in an event the current measured state exceeds a predefined limit. Furthermore, the executable instructions may cause the processor 222 to skip the MBC calculations and executions in an event the difference does not exceed the predefined threshold and the current measured state does not exceed the predefined limit. In these and other embodiments, the measured current operational state and the previous measurement may respectively correspond to consecutive time steps as defined by the clock or timing element 210.

As an example, a CCT system 11 may have a firing temperature of 700° F. in a given time step (T1). With such a firing temperature, the executable instructions may set the predefined threshold as being 7° F. or 1% of the previous firing temperature. In this case, if the firing temperature of the CCT system 11 is determined to be 708° F. at the next time step (T2), the MBC calculations and executions will be performed but if the firing temperature is only 706° F., the MBC calculations and executions will be skipped. By a similar token, if the predefined limit is 709° F. and the CCT system 11 has a steadily increasing firing temperature because it is not operating at steady state, the MBC calculations and executions may be skipped due to the firing temperature being only 706° F. at time step T2 but will be performed at time step T3 due to the predefined limit being exceeded even if the firing temperature increase from T2 to T3 is still less than the predefined threshold.

A periodicity of the operation of the measurement unit 21 may be controlled by the processor 222 or the clock or timing element 210 and may be varied in accordance with multiple design and cost considerations. In general, it is to be understood that the shorter the periodicity of the operation of the measurement unit 21, the more control the feedback control system 20 will exert over the CCT system 11. On the other hand, a longer periodicity may be associated with less control of the CCT system 11 by the feedback control system 20.

In accordance with further embodiments, the executable instructions may cause the processor 222 to identify that the operational state of the CCT system 11 is approaching the predefined limit and that trends suggest that the predefined limit will be exceeded within a certain number of time steps. In these cases, the executable instructions can cause the processor 222 to lower the predefined threshold or the predefined limit or to calculate and perform the MBC executions even if neither of the predefined threshold or the predefined limit is exceeded in the state measurement at the next time step.

With reference to FIG. 2, an operation of the gas turbine engine 10 will now be described. Initially, at operations 30 and 31, the above-mentioned predefined limit and predefined threshold are set in accordance with a previous measurement of the state of the CCT system 11. Then, at operation 32, a determination is made that a current time is a time for measuring the operational state (i.e., the state condition) of the CCT system 11 in accordance with the periodicity established by the measurement unit 21. In an event the determination is affirmed, a current operational state of the CCT system 11 will be measured by the measurement unit 21 at operation 33.

Subsequently, at operation 34, a determination is made as to whether a difference between the current operational state of the CCT system 11 and the previous measurement exceeds the predefined threshold.

In an event the difference exceeds the predefined threshold, control proceeds to operation 37. On the other hand, in an event the difference does not exceed the predefined threshold, a determination is made as to whether the current operational state of the CCT system 11 exceeds the predefined limit at operation 35. In an event the predefined limit is exceeded, control proceeds to operation 37. On the other hand, in an event the predefined limit is not exceeded, a determination is made as to whether trends suggest that the predefined threshold or the predefined limit will be expected to be exceeded shortly at operation 36. In an event this determination is negative, control reverts to operations 30 and 31 at which point the predefined threshold and predefined limit are reset. However, in an event the determination is affirmative, control proceeds to operation 37.

As shown in FIG. 2, at operation 37, the executable instructions (i.e., the event trigger controller 224) cause the processor 222 to calculate MBC executions. Then, at operation 38, the executable instructions cause the processor 222 to command the servo element 221 to perform the calculated MBC executions. Next, at operation 39, the feedback control unit 23 provides feedback control information to the controller 22 so that a performance of the controller 22 can be monitored and improved from iteration to iteration. Subsequently, control returns to operations 30 and 31 at which point the predefined threshold and predefined limit are reset.

In accordance with aspects of the invention, a technical effect of the embodiments described herein is that event trigger control is applied in gas turbine engine operation along with or in addition to MBC in order to eliminate or at least reduce a number of MBC executions. The use of the event trigger control results in MBC functionality not being executed for each time step if a state condition of the gas turbine engine does not change (e.g., if the gas turbine engine is operating at steady state). Rather, the MBC is calculated and executed when the state condition changes.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A feedback control system, comprising:
a controller to control an operation of a motive element in accordance with current and previous measured states,
the controller including a servo, a processor and an event trigger controller,
the event trigger controller being configured to cause the processor to command the servo to:
perform model based control (MBC) executions in an event a difference between the current and previous measured states exceeds a threshold based on the previous measured state or the current measured state exceeds a limit, and
skip the MBC executions in an event the difference does not exceed the threshold and the current measured state does not exceed the limit.

2. The feedback control system according to claim 1, wherein the current and previous measured states respectively correspond to consecutive time steps.

3. The feedback control system according to claim 1, further comprising:
a measurement unit to measure the state of the gas turbine engine; and
a feedback unit to provide feedback control information to the controller.

4. The feedback control system according to claim 3, wherein the measurement unit periodically measures the state of the gas turbine engine.

5. The feedback control system according to claim 1, wherein the event trigger controller is further configured to cause the processor to calculate the MBC executions.

6. The feedback control system according to claim 1, wherein the MBC executions comprise fuel control executions, inlet guide vane (IGV) control executions and fire temperature control executions.

7. The feedback control system according to claim 1, wherein the threshold comprises a range of thresholds.

8. The feedback control system according to claim 1, wherein the limit comprises one of an upper limit and a lower limit.

9. The feedback control system according to claim 1, wherein the motive element comprises a gas turbine engine.

10. A feedback control system of a gas turbine engine, comprising:
a controller to control an operation of the gas turbine engine in accordance with current and previous measured states,
the controller including a servo, a processor and a computer readable medium on which executable instructions are stored, and,
when executed, the executable instructions cause the processor to:
command the servo to perform model based control (MBC) executions in an event a difference between the current and previous measured states exceeds a threshold or the current measured state exceeds a limit; and to
command the servo to skip the MBC executions in an event the difference does not exceed the threshold and the current measured state does not exceed the limit.

11. The feedback control system according to claim 10, wherein the current and previous measured states respectively correspond to consecutive time steps.

12. The feedback control system according to claim 10, further comprising:
a measurement unit to measure the state of the gas turbine engine; and
a feedback unit to provide feedback control information to the controller.

13. The feedback control system according to claim 12, wherein the measurement unit periodically measures the state of the gas turbine engine.

14. The feedback control system according to claim 10, wherein, when executed, the executable instructions further cause the processor to calculate the MBC executions.

15. The feedback control system according to claim 10, wherein the MBC executions comprise fuel control executions, inlet guide vane (IGV) control executions and fire temperature control executions.

16. A gas turbine engine, comprising:
a compressor-combustor-turbine (CCT) system by which mechanical energy is generated from combustion of compressed inlet air and fuel; and
a feedback control system including a measurement unit configured to measure a state of the CCT system, a controller configured to control an operation of the CCT system in accordance with current and previous measured states and a feedback unit configured to provide feedback control information to the controller,
the controller including a servo, a processor and a computer readable medium on which executable instructions are stored, and,
when executed, the executable instructions cause the processor to:
command the servo to perform model based control (MBC) executions in an event a difference between the current and previous measured states exceeds a threshold or the current measured state exceeds a limit; and to:
command the servo to skip the MBC executions in an event the difference does not exceed the threshold and the current measured state does not exceed the limit.

17. The gas turbine engine according to claim 16, wherein the current and previous measured state respectively correspond to consecutive time steps.

18. The gas turbine engine according to claim 16, wherein the measurement unit periodically measures the state of the gas turbine engine.

19. The gas turbine engine according to claim 16, wherein, when executed, the executable instructions further cause the processor to calculate the MBC executions.

20. The gas turbine engine according to claim 16, wherein the MBC executions comprise fuel control executions, inlet guide vane (IGV) control executions and fire temperature control executions.

* * * * *